Aug. 30, 1927.
C. A. JOHNSON
1,640,941
THREADING TOOL
Filed Jan. 9, 1922
2 Sheets-Sheet 1
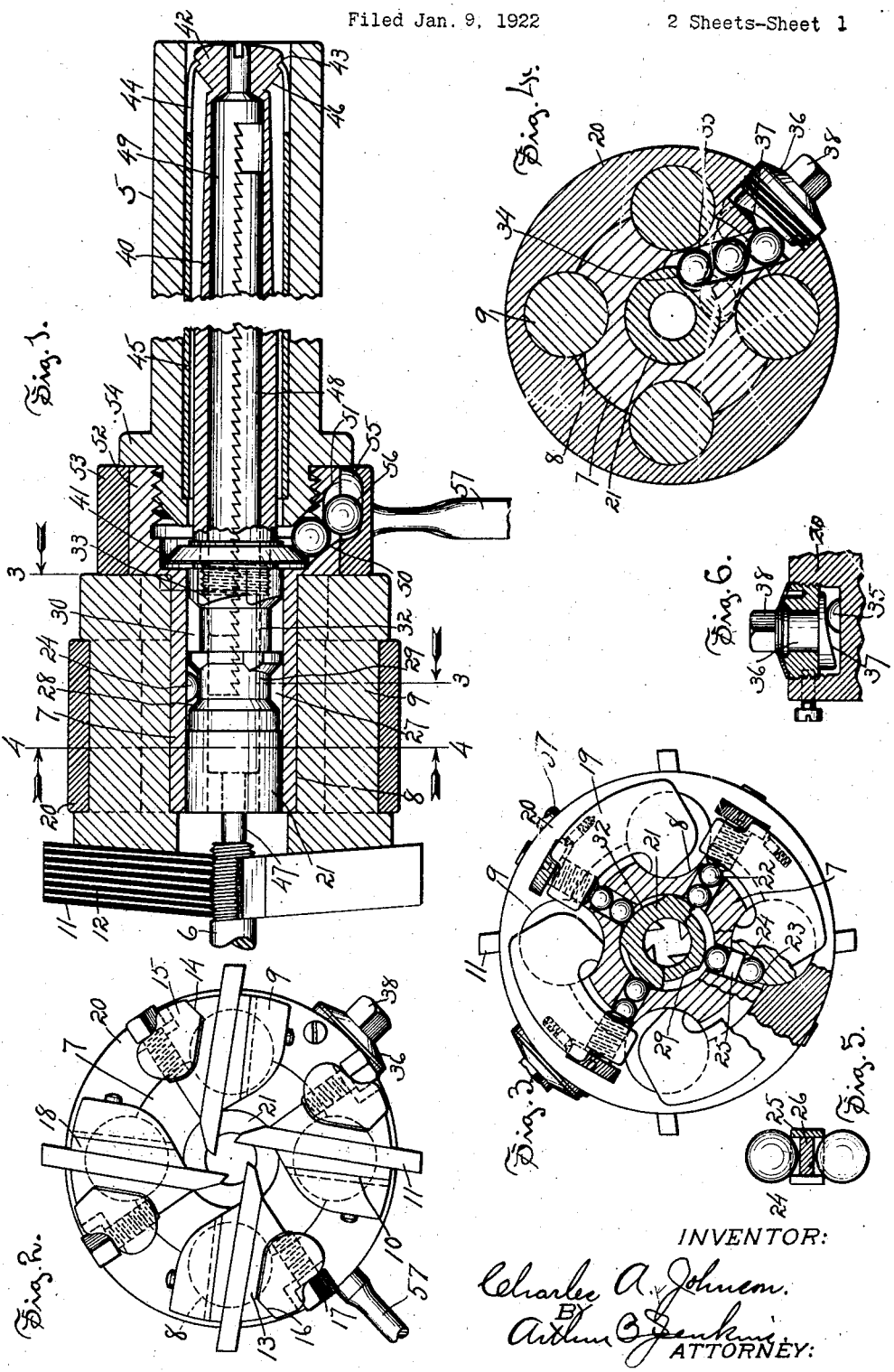
INVENTOR:
Charles A. Johnson.
BY
Arthur C. Jenkins
ATTORNEY.

Aug. 30, 1927.
C. A. JOHNSON
1,640,941
THREADING TOOL
Filed Jan. 9, 1922     2 Sheets-Sheet 2
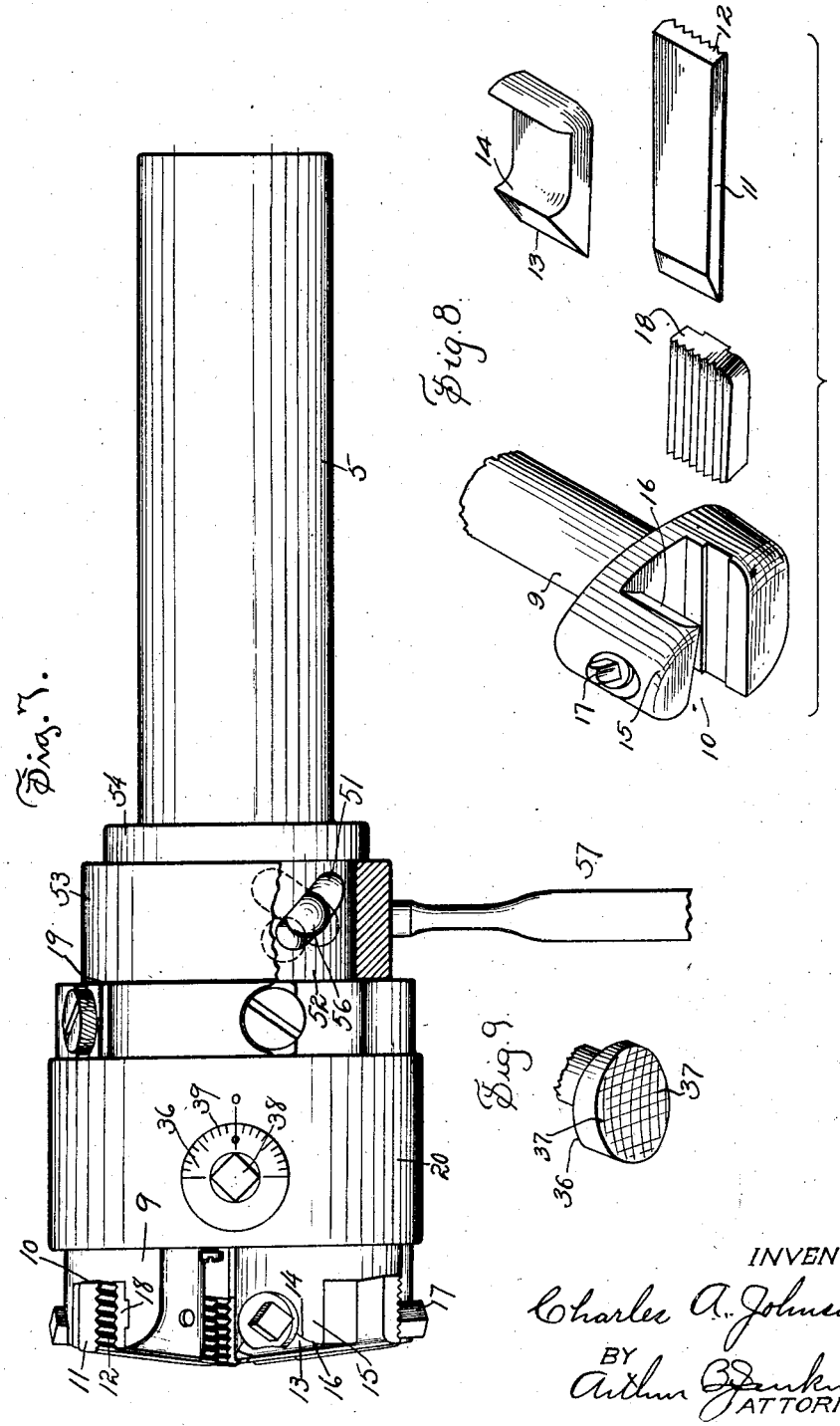
INVENTOR:
Charles A. Johnson.
BY
Arthur Jenkins
ATTORNEY:

Patented Aug. 30, 1927.

1,640,941

UNITED STATES PATENT OFFICE.

CHARLES A. JOHNSON, OF UNIONVILLE, CONNECTICUT.

THREADING TOOL.

Application filed January 9, 1922. Serial No. 527,916.

My invention relates to the class of devices for holding dies to operate in cutting threads upon blanks, and an object of my invention, among others, is to provide a device of this class that shall be strong and durable, simple in construction and particularly efficient in its operation.

One form of threading tool embodying my invention, and in the construction and use of which the objects herein set out, as well as others, may be attained, is illustrated in the accompanying drawings in which—

Figure 1 is a view in central lengthwise section through a threading tool embodying my invention.

Figure 2 is an end view of the same.

Figure 3 is a view in cross section on plane denoted by broken line 3—3 of Figure 1, the body and actuator being further broken away to illustrate the construction underneath said plane.

Figure 4 is a view in cross section on plane denoted by broken line 4—4 of Figure 1.

Figure 5 is a detail view, scale enlarged, illustrating the construction of the die opener.

Figure 6 is a view of a fragment of the retaining sleeve illustrating the construction of the adjustable connection for the actuator.

Figure 7 is a side view of my improved threading tool.

Figure 8 is a detail perspective view, scale enlarged, of one end of a die holder and a threading die, a die clamp, and a die block shown as disconnected from the holder.

Figure 9 is a detail perspective view of one end of the adjuster.

My invention is illustrated and described herein in connection with a threading tool of the general character of that shown in and forming the subject matter of patent issued to me December 18th, 1917, No. 1,250,185, the present invention being especially applicable to the device shown in said patent, to which reference is hereby made for such understanding of the construction and operation of the main device as may not be specifically illustrated and described herein.

In the accompanying drawings the numeral 5 indicates the shank of my improved threading tool that may be secured to the spindle of a lathe in any suitable manner to be driven thereby, or the shank may, in fact, constitute the spindle of the lathe if desired, it being understood that the articles to be threaded, as the end of a bolt 6, will be held in a suitable chuck or other device in a manner that will be readily understood by those skilled in the art. The body 7 of my improved threading tool is attached to the shank 5, or lathe spindle, in any suitable manner, the screw threaded end of the shank engaging a screw threaded opening in the end of the body in the means for such attachment shown herein. Grooves 8 are formed through the body at equal distances apart, four grooves being employed in the structure shown herein. Die holders 9 are located in these grooves, said holders extending through the body and projecting at opposite ends thereof.

Grooves 10 are formed across the enlarged ends of the holders to receive threading dies 11, each die having a threaded surface 12 on one side extending out at its beveled end, which end forms the thread cutting end of each die. A die clamp 13 is located in the groove in each of the holders 9, each clamp having a flat surface to engage a die on the side opposite the threaded side thereof, a crosswise cut on each clamp forming two beveled clamping or cam surfaces 14, one at each side of the cut. One side of each slot 10 comprises a projection 15 on each die holder to be received within the cut in the die clamp appurtenant thereto, one side of the projection having a beveled clamping or cam surface 16 to act upon the cam surface 14 at that side of the cut in the clamp and a clamp screw 17 extends through the projection with its end in position to act upon the cam surface 14 at the other side of the cut in the holder. A die block 18 may be employed, if desired, to receive the threaded surface of the die in each holder opposite the die clamp therein.

An actuating arm 19 extends from that end of each holder opposite its die supporting end, said arm being preferably formed integral with the holder. A retaining sleeve 20 having grooves on its inner surface corresponding to the grooves 8 and forming therewith round holes is placed upon the body to retain the die holders in place. Each arm 19 is connected with a die actuator 21 by means of a ball or balls 22 located between the arm and actuator and arranged to be pressed into contact with both, said balls or sets of balls each constituting a die closer. A recess, the end of which forms a die opening shoulder 23, is made in each holder and is connected with the actuator by a die opener 24, each opener preferably comprising two balls resiliently connected as by means of a split ring 25 within which and between the balls a spacer 26 is placed. By using spacers of different thicknesses the lengths of the openers may be adjusted to suit different conditions.

The actuator 21 is provided with a die opening groove 27, one edge of which is formed into a die opening cam 28. Sizing cams 29 are formed in the bottom of the groove 27 for the purpose of rotatably adjusting the holders, and hence the position of the dies to properly perform the special work required of them. The actuator also has a die closing groove 30, the edge of which is formed into a die closing cam, the bottom of said groove being formed into a set of sizing cams 32 and the edge of the groove comprising said cams being formed into a corresponding set of sizing cams 33 against which the die closers 22 rest. As a means of adjusting the actuator with respect to the die openers and closers, said actuator has two recesses, one end of each of which comprises an adjusting shoulder 34 to receive one end of one of two sets of balls constituting an adjusting connection 35. An adjuster 36 is rotatably mounted in the sleeve 20, in the form herein shown said adjuster comprising a bushing having screw threads fitting a screw threaded opening in said sleeve. The inner end of the adjuster, comprising a member rotatably mounted in the bushing, is formed into adjusting cams 37 and 37ª, two being shown in the structure herein oppositely disposed and sloping in opposite directions when considered with respect to the direction of rotative movement of the adjuster and one appurtenant to each set of balls 35, the cams being so arranged that when the adjuster is rotated each set of balls will be forced to move in a direction opposite to the direction of movement of the other set and to substantially the same extent. The outer end of the adjuster may be provided with means whereby it may be turned, as a squared end 38 to receive a wrench, and the adjuster also has graduations 39, as shown in Figure 7, by means of which the degree of turning movement of said adjuster may be determined.

The actuator 21 may be operated in various ways to effect opening and closing movement of the dies, in my patent hereinbefore referred to an actuating rod secured to the actuator having been employed to effect its movement in both directions. In the form of device shown herein the actuator is moved to open the dies by contact with the end of the bolt or other object being threaded and other means to be hereinafter described are employed to move the actuator to close the dies. The mechanism for effecting these operations consists of an actuator stem 40 secured to the end of the actuator as by means of interengaging screw threads, an actuator cam 41 comprising a beveled disc secured between a shoulder on the stem and the end of the actuator. The head 42 of said stem is provided with a holding groove 43 to receive retaining spring fingers 44 secured within the stem 5 in any suitable manner, as shown herein these fingers projecting from the end of a sleeve 45.

The inner end of the head is beveled to form an accelerator 46 against which the spring fingers press when released from the groove 43, this pressure causing a quick movement of the stem 40 and hence of the actuator.

An opening stud 47 is located at the end of an opening rod extending within the sleeve 45. This rod comprises two members 48 and 49 resting one against the other, the meeting edges comprising interengaging teeth, as clearly shown in Figure 1, the opening stud being located on one of the members 48 that, at this end, is of the full diameter of the rod, and the member 49 at the opposite end of the rod is also of the full diameter thereof, thus providing shoulders on each member against which the end of the opposite member may abut. The two members of the rod are held in any relative position of adjustment by means of the comparatively close fit within the stem 40 which prevents a separation of the rod members.

A hole 50 extends inwardly from a recess 51 in the outer surface of the enlarged portion 52 at the end of the body opposite the dies, the hole 50 being inclined in a radial plane and the recess 51 being located at an angle to said hole. An operating sleeve 53 is supported on the enlarged portion 52 of the body, this sleeve being preferably held in place by a flange 54 on the shank 5. A cam groove 55 is located on the inner surface of the sleeve 53, this groove extending transversely to the recess 51. A set of balls 56 are located in said hole, recess and groove, and as the sleeve 53 is turned in one direction these balls will be forced inwardly against the cam 41, thus forcing the actuator into position to close the dies, and also to engage the spring fingers 44 with the groove 43.

This sleeve may be actuated as by means of a cam arm 57 projecting from the sleeve in position to strike an object with respect to which it has relative movement, as a stationary part of a machine on which a turret within which the threading tool is mounted is rotated to bring successive dies into registering position with the means for holding the piece of metal being threaded, and in which rotation the cam arm is swept past the member by means of which it is actuated.

A single set of balls 56 have been shown and described herein as a means for operating the actuator, but I contemplate that these may be duplicated to any extent in which case they will be located in proper position with respect to the operating sleeve 53.

It will be noted that the die openers and closers 24—22 rest against sizing cam surfaces 29—32 in the bottom of the grooves in the actuator, as hereinbefore explained, and the adjustment of said openers and closers to properly position the dies 11 is obtained by slightly turning the actuator one way or the other by operation of the adjuster 36 to locate said dies closer together or farther apart. This proper adjustment having been obtained and the machine to which the tool is affixed being in operation, the dies 11 and bolt or other device 6 are caused to engage each other and a thread is cut on said bolt. When the thread has been cut of a desired length the space between said bolt and the opening stud 47 is closed and the stud and the actuator 21 to which it is secured will be moved endwise and the opening cam 28 and openers 24 will be engaged, thereby rotating the holders 9 and opening the dies. In a reverse movement of the parts the arm 57 will be brought into contact with the object for operating it and will be slightly rotated to force the balls 56 against the cam 41 and move the actuator in a direction to close the dies, after which the operation will be repeated. If the dies have been opened or closed they are retained in such positions by engagement of the spring fingers 44 with the groove 43 or underneath the head 42 and until forced from such positions by movement of the actuator endwise, as hereinbefore described.

In accordance with the provisions of the patent statutes I have described the principles of operation of my invention, together with the device which I now consider to represent the best embodiment thereof; but I desire to have it understood that the device shown is only illustrative, and that the invention may be carried out by other means and applied to uses other than those above set out.

I claim—

1. A threading tool comprising a body, die holders rotatably mounted in the body, an actuator movably mounted in the body, and connections between said die holder and actuator and comprising a plurality of balls with an adjusting spacer between them.

2. A threading tool comprising a body, die holders rotatably mounted in the body, an actuator movably mounted in the body, connections between said die holder and actuator and comprising a plurality of balls with a split ring between two of the balls, and a spacer adjustably placed within the ring and between said balls.

3. A threading tool comprising a body, die holders rotatably mounted in the body, an actuator movably mounted in the body, connections between the die holders and body for operation of said holders, sizing means upon the actuator to permit adjustment of the degree of movement of the holders, a set of balls connected with the actuator to position said actuator including said sizing means to change said degree of movement of the holders, and means accessible from the surface of the tool to operate said balls for the purpose named.

4. A threading tool comprising a body, die holders rotatably mounted in the body, an actuator movably mounted in the body, connections between said actuator and die holders, sizing means upon the actuator to permit adjustment of the degree of movement of the holders, an adjuster accessible at the outer surface of the tool, and a connection between said adjuster and actuator whereby said actuator including said sizing means are operated to move the actuator in opposite directions to change the degree of movement of said holders.

5. A threading tool comprising a body, die holders located in the body, an actuator mounted in the body and operatively connected with the die holders, said connection including means for changing the position of the die holders by rotative movement of the actuator, a cam adjuster rotatably mounted in the body and having oppositely arranged cams, and means connecting said adjuster with said actuator to rotate it in opposite directions.

6. A threading tool comprising a body, die holders rotatably mounted in the body, an actuator mounted in the body and operatively connected with the die holders, said connection including means for changing the position of the die holders by rotative movement of the actuator, a cam adjuster rotatably mounted in the body and having oppositely arranged cams, and a plurality of sets of balls connected with said cams and resting against shoulders on the actuator.

7. A threading tool comprising a body, die holders rotatably mounted in the body to operate dies carried thereby, an actuator movably mounted in the body and operatively engaged with the die holders to rotate them, a member rotatably mounted on the body, and connections between said member and actuator to operate the latter by rotative movement of said rotatably mounted member during operation of the tool to cut a thread.

8. A threading tool comprising a body, die holders rotatably mounted in the body to operate dies carried thereby, an actuator movably mounted in the body and operatively engaged with the die holders to rotate them, an operating member rotatably mounted on the body and having a cam surface, and a connection between said cam surface and said actuator to operate the latter by rotative movement of said member.

9. A threading tool comprising a body, die holders movably mounted in the body, an actuator movable lengthwise within the body and operatively connected with the holders, an operating member rotatably mounted on the body and having a cam surface, and a plurality of balls extending between said cam surface and said actuator to effect endwise movement of the latter by reason of rotative movement of said member.

10. A threading tool comprising a body having a hole extending diagonally into a central opening therein, die holders movably mounted in the body, an actuator movable lengthwise within said opening, a cam surface located on the side of the actuator, an operating member rotatably mounted on the body and having a cam recess registering with said hole, and a set of balls located in said hole and recess to effect an operative connection between said member and said actuator.

11. A threading tool comprising a body, die holders movably mounted in the body to operate dies carried thereby, an actuator movable lengthwise within the body to actuate said holders for opening and closing movements, means located within the body and adapted to be moved to resiliently engage said actuator and retain it in one position, and means to operate the actuator to force it from engagement with said retaining means.

12. A threading tool comprising a body, die holders movably mounted in the body, an actuator movable lengthwise within the body and operatively connected with said holders, an actuator stem rigidly connected with the actuator and having a groove, spring actuated retaining members located within the body and having fingers to engage said groove to retain the actuator in one position, and means for moving the actuator to disengage it from said fingers.

13. A threading tool comprising a body, die holders movably mounted in the body, an actuator mounted in the body and operatively connected with said holders, means located within the actuator to operate it and comprising two members extensible one with respect to the other, and means for retaining said members in different relative positions.

14. A threading tool comprising a body, die holders movably mounted in the body, an actuator movably mounted in the body and operatively connected with the die holders, and an actuator operating member located within the actuator and comprising two parts extensible one with respect to the other and having toothed meeting surfaces.

15. A threading tool comprising a body, a die holder rotatably mounted in the body and having a groove therein, a die clamp located in said groove to retain a die in place, said clamp having opposing cam surfaces, and means acting upon one of said cam surfaces to force the clamp into engagement with the tool and to press the other cam surface against an opposing member.

16. A threading tool comprising a body, a die holder rotatably mounted in the body and having a groove in its end forming a projection with a cam surface thereon, a die clamp located in said groove and having opposing cam surfaces one of which engages the cam surface on said projection, and means for forcing the clamp against said tool and said cam surfaces one against the other.

17. A threading tool comprising a body, die holders rotatably mounted in the body, an actuator movably mounted in the body, connections between said die holder and actuator and comprising a plurality of balls with a split ring between two of the balls, and a spacer located within the ring and between said balls.

18. A threading tool comprising a body, die holders rotatably mounted in the body, an actuator movably mounted in the body, connections between said die holder and body for operation of said holders, means upon the actuator to permit adjustment to change the amount of movement of the holders, a member accessible from the surface of the tool for effecting said adjustment, and an operative connection between said member and said adjusting means upon the actuator.

19. A threading tool comprising a body, die holders rotatably mounted in the body, an actuator rotatably mounted in the body and having oppositely extending sizing cam surfaces, connections between said cam surfaces and die holders for operation of the latter, and means for rotatively adjusting the position of said actuator to change the amount of rotative movement of the actuator.

20. A threading tool comprising a body, die holders rotatably mounted in the body, an actuator rotatably mounted in the body and having oppositely extending sizing cam surfaces, a die opening connection between one of said cam surfaces and a die holder, a die closing connection between the other of said cam surfaces and a die holder, and means for rotatively adjusting the position of said actuator to change the amount of rotative movement of the actuator.

CHARLES A. JOHNSON.